United States Patent [19]
Griffin

[11] Patent Number: 5,280,418
[45] Date of Patent: Jan. 18, 1994

[54] VOLTAGE REGULATION IN A RAILWAY POWER DISTRIBUTION SYSTEM

[76] Inventor: Anthony J. Griffin, 13 Bungalow Road, Peakhurst, New South Wales, 2210, Australia

[21] Appl. No.: 914,251

[22] Filed: Jul. 15, 1992

Related U.S. Application Data

[63] Continuation of Ser. No. 595,984, Nov. 11, 1990.

[51] Int. Cl.$^5$ .............................................. B60M 5/00
[52] U.S. Cl. ........................................ 363/34; 363/37; 238/14.2; 191/6
[58] Field of Search .................... 191/6; 238/14.2; 363/34, 35, 37, 65, 70, 71

[56] References Cited

U.S. PATENT DOCUMENTS

| | | | |
|---|---|---|---|
| 3,614,461 | 10/1971 | Speer | 363/34 |
| 4,523,059 | 6/1985 | Kawamura | 191/6 |
| 4,599,519 | 7/1986 | Boenig | 363/35 |
| 4,680,663 | 7/1987 | Nogi et al. | 104/289 |
| 4,719,550 | 1/1988 | Powell et al. | 363/37 |
| 4,731,723 | 3/1988 | Nogi et al. | 363/70 |
| 5,142,277 | 8/1992 | Yarberry et al. | 246/169 R |

OTHER PUBLICATIONS

"Method of Improving the Voltage Regulation on 25 KV Electric Railways" by A. J. Griffin, published at the Fourth International Heavy Haul Railway Conference, in York, England, Sep. 1989.

*Primary Examiner*—J. L. Sterrett
*Attorney, Agent, or Firm*—Hopgood, Calimafde, Kalil, Blaustein & Judlowe

[57] ABSTRACT

Disclosed is an a.c. electric railway power distribution system comprising an a.c. busbar having at least first and second a.c. busbar sections electrically isolated by a non-energized busbar. Each of a.c. busbar sections is capable of having at least one electric train electrically connected thereto as the train moves along a railway track. A first single phase a.c. power supply is operably connected to the first a.c. busbar section and a second single phase a.c. power supply is operably connected to the second a.c. busbar section. An a.c. to d.c. electronic power converter is provided having an input operably connected to the first a.c. busbar section, and having an output operably connected to a d.c. busbar. A d.c. to a.c. electronic power converter is also provided having an input operably connected to the d.c. busbar and having an output operably connected to the second a.c. busbar section. A control unit controls the operation of the electronic power converters so as to either generate or absorb reactive power between the first a.c. busbar section and the a.c. to d.c. electronic power converter, and to either generate or absorb reactive power between the second a.c. busbar section and the d.c. to a.c. electronic power converter. In this way, voltage regulation is effectively facilitated along the a.c. busbar sections of the system.

8 Claims, 3 Drawing Sheets

VOLTAGE REGULATION IN A RAILWAY POWER DISTRIBUTION SYSTEM

This is a continuation of application Ser. No. 07/595,984 entitled: voltage regulation/conversion device and method filed on Nov. 11, 1990.

BACKGROUND OF THE INVENTION

1. Field of the Invention

The present invention relates to a method and apparatus for regulating the voltage of single phase power feed lines connected to adjacent electrically isolated a.c. busbar sections in an electric railway power distribution system.

1. Brief Description of the Prior Art

In conventional electric railway traction systems, trains run along railway tracks which are at electrical ground, while single phase power is distributed variable to electric trains (i.e. variable railway loads) by an a.c. busbar which, in a catenary type system, is realized as wiring running above the railway tracks. Typically, adjacent pairs of a.c. busbar sections are electrically isolated from each other by an open circuit or dead section, referred to as a midpoint or junction along the a.c. busbar. As illustrated in FIG. 1, alternate pairs of adjacent a.c. busbar sections 1 and 2 separated by open circuit midpoint section 3 are fed with a first phase pair 5 provided to a power supply substation 4 from a three phase power supply system (not shown). As shown, first phase pair 5 is operably connected to a.c. busbar sections 1 and 2 using a transformer 6 and in-line circuit breakers 7. Similarly, adjacent a.c. busbar sections 8 and 13 separated by open circuit midpoint section 3' are fed with a second phase pair provided to power supply substation 4' from the three phase power supply system. Also shown, second phase pair 5' is operably connected to a.c. busbar section 8 and 13 using transformer 6' and in-line circuit breaker 7'. Due to the configuration of the power distribution system, power supply substations 4 and 4' provide different sources of single phase a.c. power to a.c. busbar sections 2 and 8, disposed on opposite sides of open circuit midpoint section 9 along the a.c. busbar.

When a pantograph 10 of electric train 11 slides onto midpoint section 9, single phase power supplied to the electric train from power supply substation 4, is automatically disconnected. While the pantograph slides along midpoint section 9, there is no contribution of power from a.c. busbar sections 2 or 8. Then, when the pantograph slides from midpoint section 9 onto a.c. busbar section 8, single phase power from power supply substation 4' is automatically provided to the pantograph. During this sliding "make-before-break" transfer of the pantograph along the a.c. busbar, a.c. busbar sections 2 and 8 are never electrically shorted. If the electrically isolated midpoint section 9 did not exist, undesirable reactive power flows would occur between a.c. busbar sections 2 and 8, as the a.c. power along these different a.c. busbar sections is out of phase due to loading conditions along these sections and the phase-relationship of the first and second phase pairs provided to power substations 4 and 4'. Typically, this has a significant influence on the voltage regulation of the electric railway system.

There are, of course, other factors which influence voltage regulation within electric railway power distribution systems of the type described above. Such factors include, for example, constantly changing grades along which trains move over the railway; operating conditions which necessitate that trains decelerate for speed restrictions, crossings with other trains, slowing and stopping for railroad signals; and required acceleration after stopping to pick up passengers, or to avoid encountered conditions along the railway track.

In order to improve the voltage regulation and load factor of prior art electric railway power distribution systems, a number of proposals have been set forth and implemented. These prior art proposals are discussed at length in Applicant's paper entitled "Methods Of Improving The Voltage Regulation Of 25Kv 50Hz Electric Railways," published in the Fourth International Heavy Haul Railway Conference, September 1989. Such prior art techniques include, for example, (i) reducing the distance between high voltage power supply substations, (ii) providing switching stations between these power supply substations, (iii) providing series or shunt connected compacitors to reduce active load along the power distribution system; and (iv) providing transformer-type regulations in order to provide voltage regulation. As discussed in Applicant's paper, each of these approaches suffers from a number of shortcomings and drawbacks, including the high cost of implementation or other adverse effects due to high consumption of electrical power.

One approach used by the French National Railway System involves installing equipment at power switching substation 12 in order to galvanically connect a.c. busbar sections 2 and 8 at midpoint section 9, as these a.c. busbar sections are fed single phase power from synchronized power supply substations 4 and 4'. The purpose of this switching scheme is to connect these a.c. busbar sections in an electrical parallel configuration. In France, essentially constant loading conditions exist along the power distribution system, and thus permit single phase a.c. feed supplies from adjacent power substations to remain sufficiently in phase. As a result, fast protection can be installed and voltage regulation along the electric railway power distribution system can be halved by the galvanically connected adjacent a.c. busbar sections at open circuit midpoint sections along the a.c. busbar. However, in Australia and other places where variable loading conditions are expected along the power distribution system, this paralleling technique is generally unacceptable.

Thus, there is a great need in the electric railway art for a way in which to interconnect unsynchronized and synchronized but out of single phase power feed lines supplying power to electrically isolated a.c. busbar sections of an electric railway power distribution system, while achieving voltage regulation along the system and avoiding the shortcomings and drawbacks of prior art methodologies.

OBJECTS AND SUMMARY OF THE PRESENT INVENTION

Accordingly, it is a primary object of the present invention to provide a method and apparatus for interconnecting adjacent a.c. busbar sections electrically isolated by an open circuit midpoint section (i.e. nonenergized busbar section) along the a.c. busbar of a single phase electric railway power distribution system, so as to regulate the voltage therealong in a cost effective manner.

It is a further object of the present invention to provide such apparatus which utilizes a pair of electronic power converters for interconnecting these adjacent a.c. busbar sections.

It is another object of the present invention to provide such apparatus, which also includes an energy storage mechanism for real-time storage retrieval of energy so that the electronic power converters can be operated to generate and absorb real and reactive power between the a.c. busbar sections and thus achieve voltage regulation along the system.

According to one aspect of the present invention, the voltage regulation apparatus of the present invention is installed at open circuit midpoint sections along the a.c. busbar of a single phase electric railway power distribution system. In general, the electric railway power distribution system includes an a.c. busbar having at least first and second a.c. busbar sections, each of which is capable of having at least one variable railway load (e.g. an electric train) operably connected thereto by way of a pantograph, for example. In a conventional manner, the variable railway load is transportable along the first and second a.c. busbar sections as it moves along the railway tracks of the electric railway traction system. At each open circuit midpoint section of the a.c. busbar, the first a.c. busbar section is electrically isolated from the second a.c. busbar section by way of the open circuit point section. In a conventional manner, the first a.c. busbar section has a first single phase power supply operably connected thereto, whereas the second a.c. busbar section has a second single phase power supply operably connected thereto.

In general, the voltage regulation apparatus of the present invention comprises a number of components, namely: d.c. busbar; a.c. to d.c. power conversion means; d.c. to a.c. power conversion means; energy storage means; and control means. The a.c. to d.c. power conversion means has an input operably connected to the first a.c. busbar section and an output operably connected to the d.c. busbar. The d.c. to a.c. power conversion means, on the other hand, has an input operably connected to the d.c. busbar and an output operably connected to the second a.c. busbar section. The energy storage means is operably connected to the d.c. busbar for storing energy absorbed from the first a.c. busbar section, and for supplying stored energy to the d.c. to a.c. power conversion means. The function of the control means is to control the operation of the a.c. to d.c. power conversion means so as to generate or absorb real and reactive power between the first a.c. busbar section and the a.c. to d.c. power conversion means. In addition, the control means controls the operation of the d.c. to a.c. power conversion means so as to either generate or absorb real and reactive power between the second a.c. busbar section and the d.c. to a.c. power conversion means. In this way, a fully bidirectional interconnector is provided between the first and second a.c. busbar sections for the purpose of facilitating voltage regulation therealong.

In the preferred embodiment, the a.c. to d.c. power conversion means is realized by an electronic a.c. to d.c. power converter and the d.c. to a.c. power conversion means is realized by an electronic d.c. to a.c. power converter. In addition, the voltage regulation apparatus further comprises a first transformer operably connected between the first a.c. busbar section and the a.c. to d.c. power converter, and also a second transformer operably connected between the second a.c. busbar section and the d.c. to a.c. power connector. Preferably, the energy storage means is realized as either a d.c. capacitor or a chemical storage battery.

These and other objects of the present invention will become apparent hereinafter.

BRIEF DESCRIPTION OF THE DRAWINGS

In order to more fully understand the objects of present invention, the Detailed Description of the Illustrative Embodiments is to be taken in connection with the accompanying drawings, wherein.

DETAILED DESCRIPTION OF THE ILLUSTRATIVE EMBODIMENTS

Figure 1:
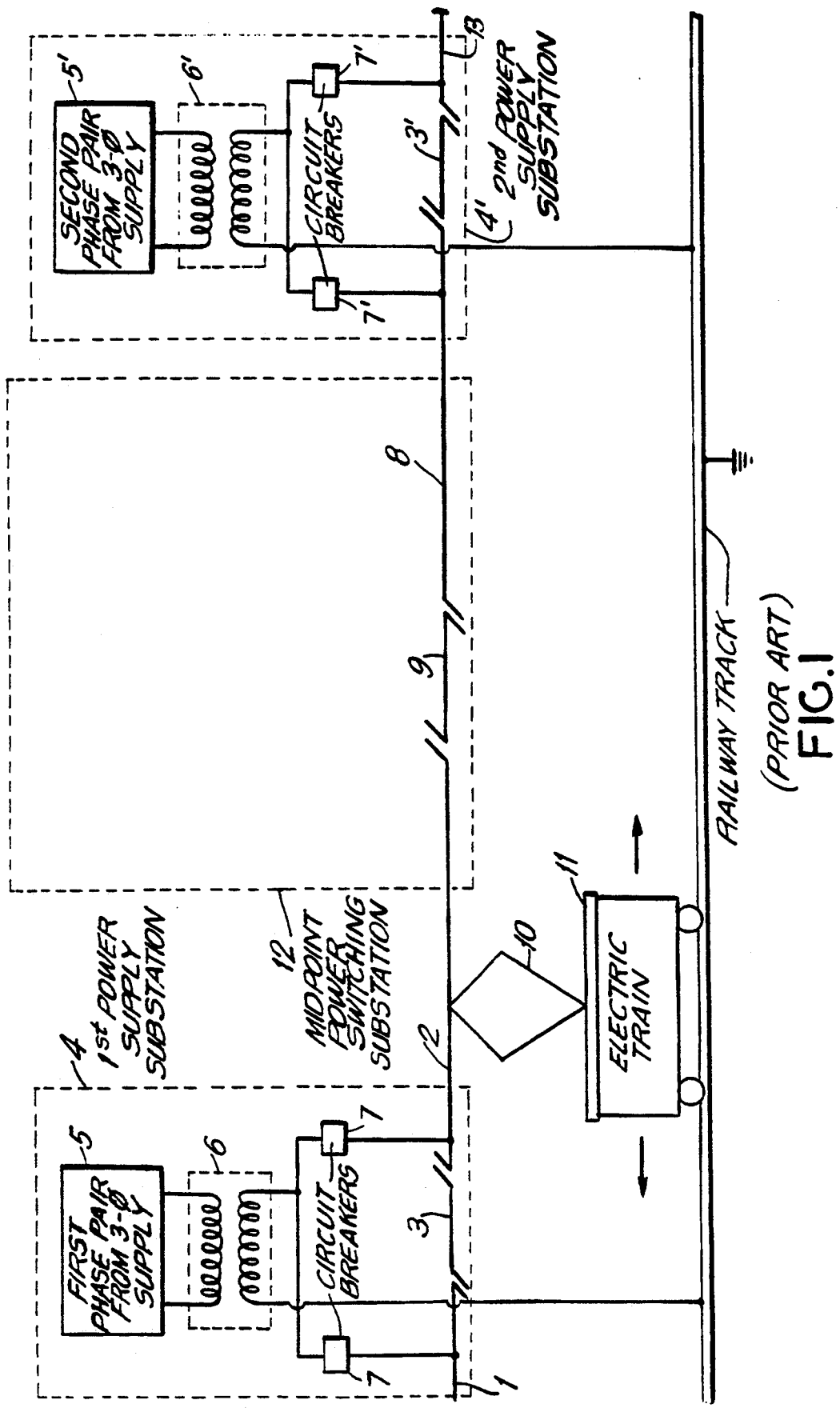
FIG. 1 is a schematic diagram illustrating a conventional a.c. electric railway power distribution system.
Figure 2:
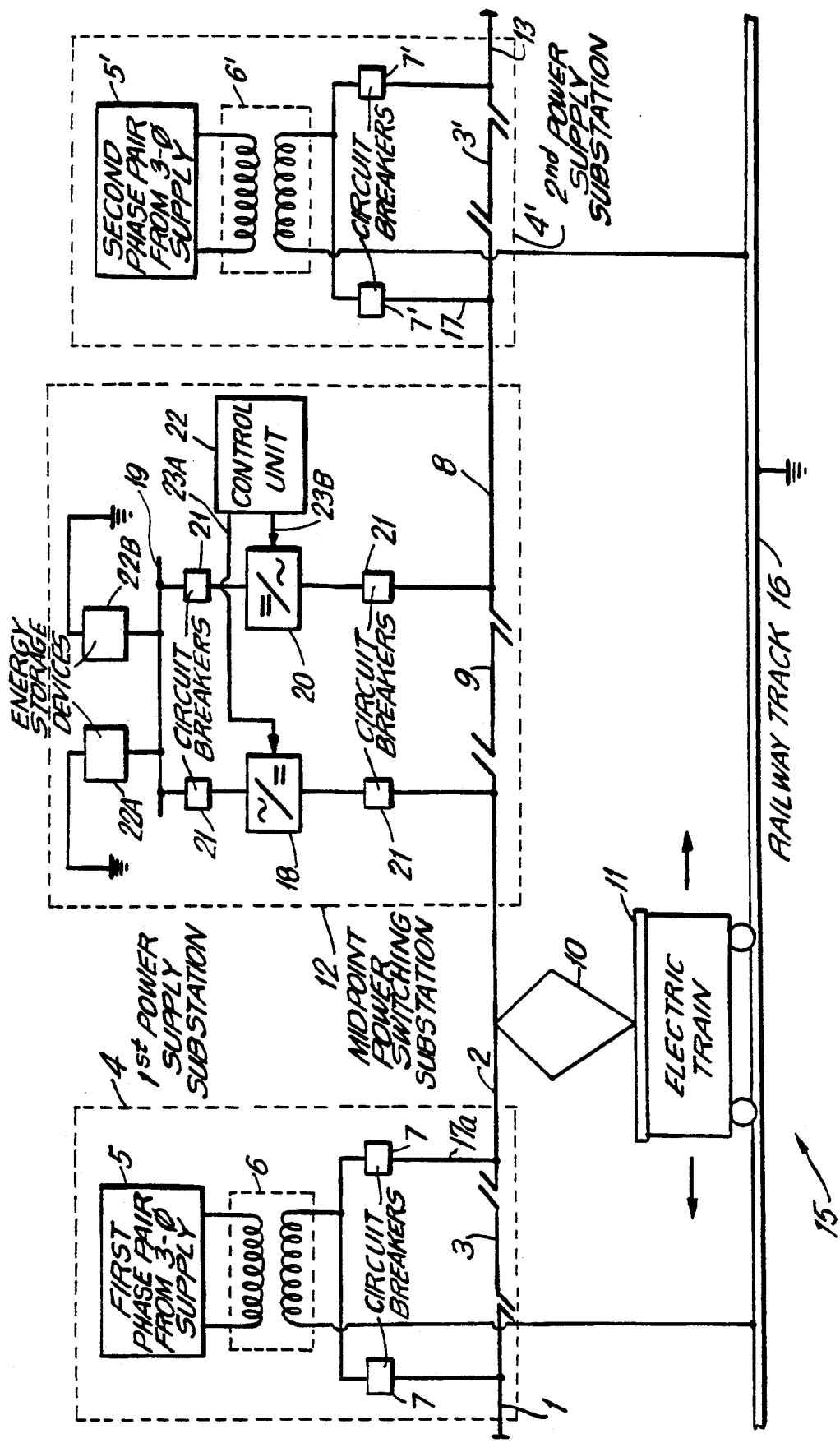
FIG. 2 is a schematic diagram illustrating a first embodiment of the voltage regulation apparatus of the present invention operably connected at an open circuit midpoint section along the a.c. busbar of an a.c. electric railway power distribution system.

Referring to FIG. 2, there is shown an a.c. electric railway power distribution system constructed in accordance with the first illustrative embodiment of the present invention.

As shown in FIG. 2, electric railway power distribution system 15 comprises an a.c. busbar having at least first and second a.c. bus bar sections 2 and 8. As illustrated, these a.c. busbar sections are electrically isolated from each other by open circuit midpoint section (i.e. non-energized busbar section) 9 along the a.c. busbar, preferably at switching substation 12 situated between power substations 4 and 4'. In a conventional manner, each a.c busbar section 2 and 8 is adapted so that at least one variable single phase railway load (i.e. electric train) 11 is electrically connected thereto by way of, for example, pantograph 10, thus permitting the train to move along railway track 16.

As illustrated in FIG. 2, first a.c. busbar section 2 is operably connected to a single phase a.c. power supply line 16 supplied from a first phase pair provided to power supply substation 4 by a three phase power supply system (not shown). Similarly, a.c. busbar section 8 is operably connected to a second single phase a.c. power supply line 17 supplied from second (i.e. different) phase pair provided to power supply substation 4'from the three-phase power supply system. The nominal magnitude of the voltage along these power supply lines is typically about 25K volts at a line frequency of about 50Hz, although it is understood that these parameters will change from embodiment to embodiment.

As illustrated in FIG. 2, an electronically controllable a.c. to d.c. power converter 18 has an input which is operably connected to first a.c. busbar section 2 and an output operably connected to d.c. busbar 19. On the other hand, an electrically controllable d.c. to a.c. power converter 20 has an input operably connected to d.c. busbar 19 and an output operably connected to second a.c. busbar section 8. As shown, circuit breakers 21 are connected between the a.c. busbar sections 2 and 8 and electronic power converters 18 and 20. In the illustrative embodiment, energy storage means 22 is realized as a d.c. capacitor and chemical battery 22A and 22B, respectively, and are operably connected to d.c. busbar 19 as shown. The operation of a.c. to d.c. and d.c. to a.c. power converters 18 and 20, is controlled by control signals generated by control unit 22 and transmitted to these electronic power converters over control buses 23A and 23B, as shown. These control signals may be derived by monitoring a single control point or remote control points along the system, or the system voltage on the d.c. or a.c. line, in order to control the operation of electronic power converters 18 and 20.

The function of control unit 22 is (i) to control the operation of a.c. to d.c. power converter 18 so as to either generate or absorb real and reactive power between a.c. busbar section 2 and a.c. to d.c. power converter 18, and (ii) to control the operation of d.c. to a.c. power converter 20 so as to either generate or absorb real and real and reactive power between a.c. busbar section 8 and d.c. to a.c. power converter 20. In this way, by interchanging power between a.c. busbar sections 2 and 8 at open circuit midpoint section 9 along the a.c. busbar, voltage regulation along these a.c. busbar sections is achieved in a cost effective manner.

The operation of the voltage regulation apparatus of the present invention is described as follows.

During a high voltage period along a.c. busbar section 2, excess power over that time period is converted from a.c. power to d.c. power by way of a.c. to d.c. power converter 18, and is then stored in energy storage devices 22A and 22B by way of d.c. busbar 19. Then, during a low voltage period along a.c. busbar section 8, energy stored in energy storage devices 22A and 22B is converted back into a.c. power by d.c. to a.c. power converter 20 by way of d.c. busbar 19, and is then provided to a.c. busbar section 8 in order to supplement the low a.c. supply voltage on this line. The result of these power conversion operations is to achieve voltage regulation.

The real-time power conversion operations performed by the apparatus of the present invention is achieved by controlling electronic power converters 18 and 20 using control unit 20, as described above. By controlling the operation of electronic power converters 18 and 20 on a real-time basis, the phase angle of the power output of d.c. to a.c. power converter 20 is regulated so that it either generates or absorbs real and reactive power from the a.c. electric railway power distribution system. This generation or absorption of real and reactive power, in turn, modifies the quantity of real and reactive power transmitted from power supply substation 4', and hence achieves voltage regulation throughout the electric railway power distribution system.

The voltage regulation apparatus of the present invention described above may be arranged in a variety of ways. For example, it may be arranged to function automatically, that is, controlled by the system voltage at the point of installation only (i.e. at a.c. busbar sections 2 and 8 adjacent midpoint open circuit 9). Alternatively, it may be controlled by signals derived from remote control points in the system so as to promote changes in the performance thereof at locations remote from the point of installation of the voltage regulation apparatus. Such changes in performance may include leveling of the demand of single phase power provided from power supply substations 4 and 4', voltage regulation in the single electric railway distribution system, and power factor control in the electric railway power distribution system.

Figure 3:
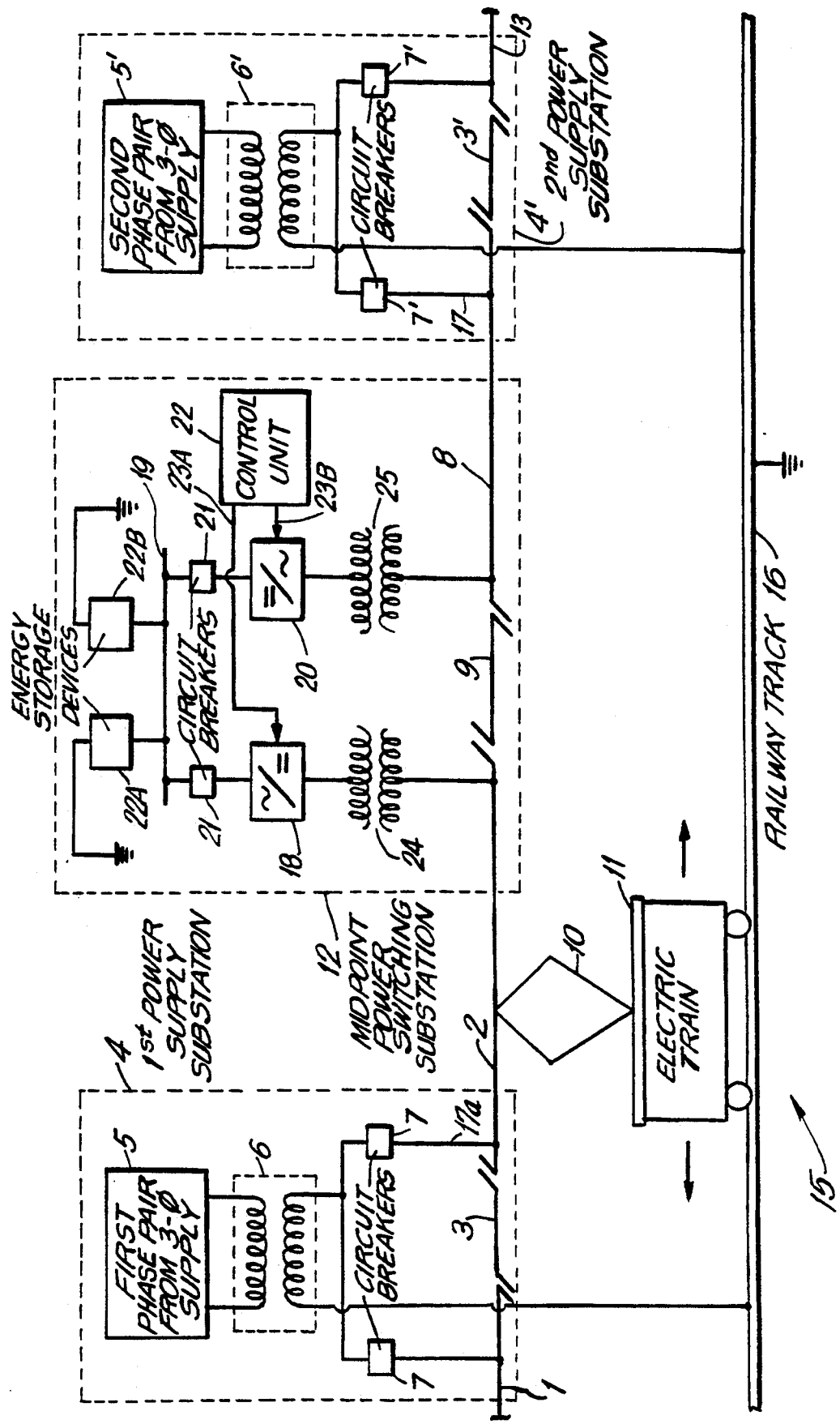
FIG. 3 is a schematic diagram illustrating a second embodiment of the voltage regulation apparatus of the present invention operably connected at an open circuit midpoint section along the a.c. busbar of an a.c. electric railway power distribution system.

Referring now to FIG. 3, an alternative embodiment of the voltage regulation apparatus of the present invention is shown. As illustrated, this embodiment of the present invention differs in only one minor respect, namely, a.c. busbar section 2 is operably connected to a.c. to d.c. power converter 18 by transformer 24, and a.c. busbar section 8 is operably connected to d.c. to a.c. power converter 20 by transformer 25. In all other respects, these embodiments include like elements indicated by like reference numbers.

As a result of the present invention, a novel mechanism has been provided for interconnecting a.c. busbar sections which are electrically isolated by an open circuit midpoint section along the a.c. busbar of an a.c. electric railway power distribution system. Using this novel mechanism, voltage along the a.c. busbar section can be effectively regulated while reducing the operating costs of the system.

While the particular embodiment shown and described above has proven to be useful in many applications in the electric railway power distribution art, further modifications of the present invention herein disclosed will occur to persons skilled in the art. All such modifications are deemed to be within the scope and spirit of the present invention defined by the appended claims.

What is claimed is:

1. Electric railway voltage regulation apparatus adapted for installation about a nonenergized busbar in an a.c. electric railway power distribution system including an a.c. busbar having at least first and second a.c. busbar sections, each said a.c. busbar section being capable of having at least one variable railway load operably connected thereto as said variable railway load moves along a railway track, said first a.c. busbar section being electrically isolated from said second a.c. busbar section by said non-energized busbar, said first a.c. busbar section having a first single phase a.c. power supply connected thereto and said second a.c. busbar section having a second single phase a.c. power supply connected thereto, said electric railway voltage regulation apparatus comprising:

a d.c. busbar;

an a.c. to d.c. power conversion means having an input adapted for operable connection to said first a.c. busbar section of said a.c. electric railway power distribution system, and having an output operably connected to said d.c. busbar;

a d.c. to a.c. power conversion means having an input operably connected to said d.c. busbar and having an output adapted for operable connection to said second a.c. busbar section of said a.c. electric railway power distribution system;

energy storage means operably connected to said d.c. busbar for storing energy produced from the output of said a.c. to d.c. power conversion means, and for supplying said energy to said d.c. to a.c. power conversion means; and control means for controlling the operation of said a.c. to d.c. power conversion means so as to either generate or absorb reactive power between said first a.c. busbar section and said a.c. to d.c. power conversion means, and for controlling the operation of said d.c. to a.c. power conversion means so as to either generate or absorb reactive power between said second a.c. busbar section and said d.c. to a.c. power conversion means, thereby facilitating voltage regulation along said first and second a.c. busbar sections.

2. The electric railway voltage regulation apparatus of claim 1, which further comprises a first transformer operably connected between said a.c. to d.c. power conversion means and said first a.c. busbar section, and
a second transformer operably connected between said d.c. to a.c. power conversion means and said second a.c. busbar section.

3. The electric railway voltage regulation apparatus of claim 2, wherein said energy storage means is a device selected from the group consisting of a d.c. capacitor and a chemical storage battery.

4. The electric railway voltage regulation system of claim 1, wherein said variable railway load comprises an electric train.

5. The electric railway power distribution system of claim 4, wherein said energy storage means is a device selected from the group consisting of a d.c. capacitor and a chemical storage battery.

6. An electric railway power distribution system comprising:
an a.c. busbar having at least first and second a.c. busbar sections, each said a.c. busbar section having at least one variable railway load operably connected thereto as said variable railway load moves along a railway track, said first a.c. busbar section being electrically isolated from said second a.c. busbar section by a non-energized busbar;
a first single phase a.c. power supply operably connected to said first a.c. busbar section;
a second single phase a.c. power supply operably connected to said second a.c. busbar section;
a d.c. busbar;
an a.c. to d.c. power conversion means having an input an input operably connected to said first a.c. busbar section, and having an output operably connected to said d.c. busbar;
a d.c. to a.c. power conversion means having an input operably connected to said d.c. busbar and having an output operably connected to said second a.c. busbar section;
energy storage means operably connected to said d.c. busbar for storing energy produced from the output of said a.c. to d.c. power conversion means, and for supplying said stored energy to said d.c. to a.c. power conversion means; and
control means for controlling the operation of said a.c. to d.c. power conversion means so as to either generate or absorb reactive power between said first a.c. busbar section and said a.c. to d.c. power conversion means, and for controlling the operation of said d.c. to a.c. power conversion means so as to either generate or absorb reactive power between said second a.c. busbar section and said d.c. to a.c. power conversion means, thereby facilitating voltage regulation along said first and second a.c. busbar sections.

7. The electric railway power distribution system of claim 6, which further comprises
a first transformer operably connected between said a.c. to d.c. power conversion means, and said first a.c. busbar section, and
a second transformer operably connected between said d.c. to a.c. power conversion means and said second a.c. busbar section.

8. The electric railway power distribution system of claim 6, wherein said variable railway load comprises an electric train.

* * * * *